(12) United States Patent
Monbaliu

(10) Patent No.: US 11,161,382 B2
(45) Date of Patent: Nov. 2, 2021

(54) AXLE ARRANGEMENT FOR AN AGRICULTURAL BALER

(71) Applicant: CNH Industrial America LLC, New Holland, PA (US)

(72) Inventor: Sven Monbaliu, Zuienkerke (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/252,901

(22) PCT Filed: Jun. 19, 2019

(86) PCT No.: PCT/EP2019/066301
§ 371 (c)(1),
(2) Date: Dec. 16, 2020

(87) PCT Pub. No.: WO2019/243475
PCT Pub. Date: Dec. 26, 2019

(65) Prior Publication Data
US 2021/0252929 A1    Aug. 19, 2021

(30) Foreign Application Priority Data

Jun. 20, 2018   (BE) .................................. 2018/5421

(51) Int. Cl.
*B60G 5/047* (2006.01)
*A01F 15/08* (2006.01)
(Continued)

(52) U.S. Cl.
CPC .............. *B60G 5/047* (2013.01); *A01F 15/08* (2013.01); *B60G 9/003* (2013.01); *A01F 15/04* (2013.01);
(Continued)

(58) Field of Classification Search
CPC ......... A01F 15/08; B60G 5/047; B60G 5/053; B60G 9/003; B60G 2204/81; B60G 2204/8302; B60G 21/045
See application file for complete search history.

(56) References Cited

U.S. PATENT DOCUMENTS 2,270,022 A * 1/1942 Price ...................... B60G 5/047
280/686
2,396,720 A * 3/1946 Nolt .......................... F16D 3/34
100/48
(Continued)

FOREIGN PATENT DOCUMENTS

FR      2132131 A1    11/1972
GB      2016388 A      9/1979
(Continued)

OTHER PUBLICATIONS

PCT International Search Report for PCT application PCT/EP2019/066301, dated Aug. 21, 2019 (12 pages).

*Primary Examiner* — Ruth Ilan
(74) *Attorney, Agent, or Firm* — Peter Zacharias; Patrick Sheldrake

(57) ABSTRACT

An axle arrangement for a baler includes a first axle, a second axle, and a pair of elongate members. The first axle has first and second ends. First and second suspension cylinders are positioned at the first and second ends. The first axle is coupled with the chassis. The second axle has first and second ends. First and second suspension cylinders are positioned at the first and second ends to accommodate generally vertical loads. A first elongate member interconnects the first end of the second axle with the first end of the first axle. A second elongate member interconnects the second end of the second axle with the second end of the first axle.

12 Claims, 4 Drawing Sheets

(51) Int. Cl.
*B60G 9/00* (2006.01)
*A01F 15/04* (2006.01)

(52) U.S. Cl.
CPC .... *B60G 2200/341* (2013.01); *B60G 2204/81* (2013.01); *B60G 2204/8302* (2013.01); *B60G 2206/31* (2013.01); *B60G 2300/04* (2013.01); *B60G 2300/08* (2013.01)

(56) References Cited

U.S. PATENT DOCUMENTS

| | | | |
|---|---|---|---|
| 8,869,688 B2* | 10/2014 | Bruning | A01F 21/00 100/8 |
| 10,785,917 B2* | 9/2020 | Gresch | A01F 15/046 |
| 2009/0199603 A1 | 8/2009 | Baldauf et al. | |
| 2020/0022311 A1* | 1/2020 | Monbaliu | B60G 9/003 |
| 2021/0114428 A1* | 4/2021 | Demon | B60G 21/067 |

FOREIGN PATENT DOCUMENTS

| | | |
|---|---|---|
| GB | 2254056 A | 9/1992 |
| WO | 02/47926 A1 | 6/2002 |

\* cited by examiner

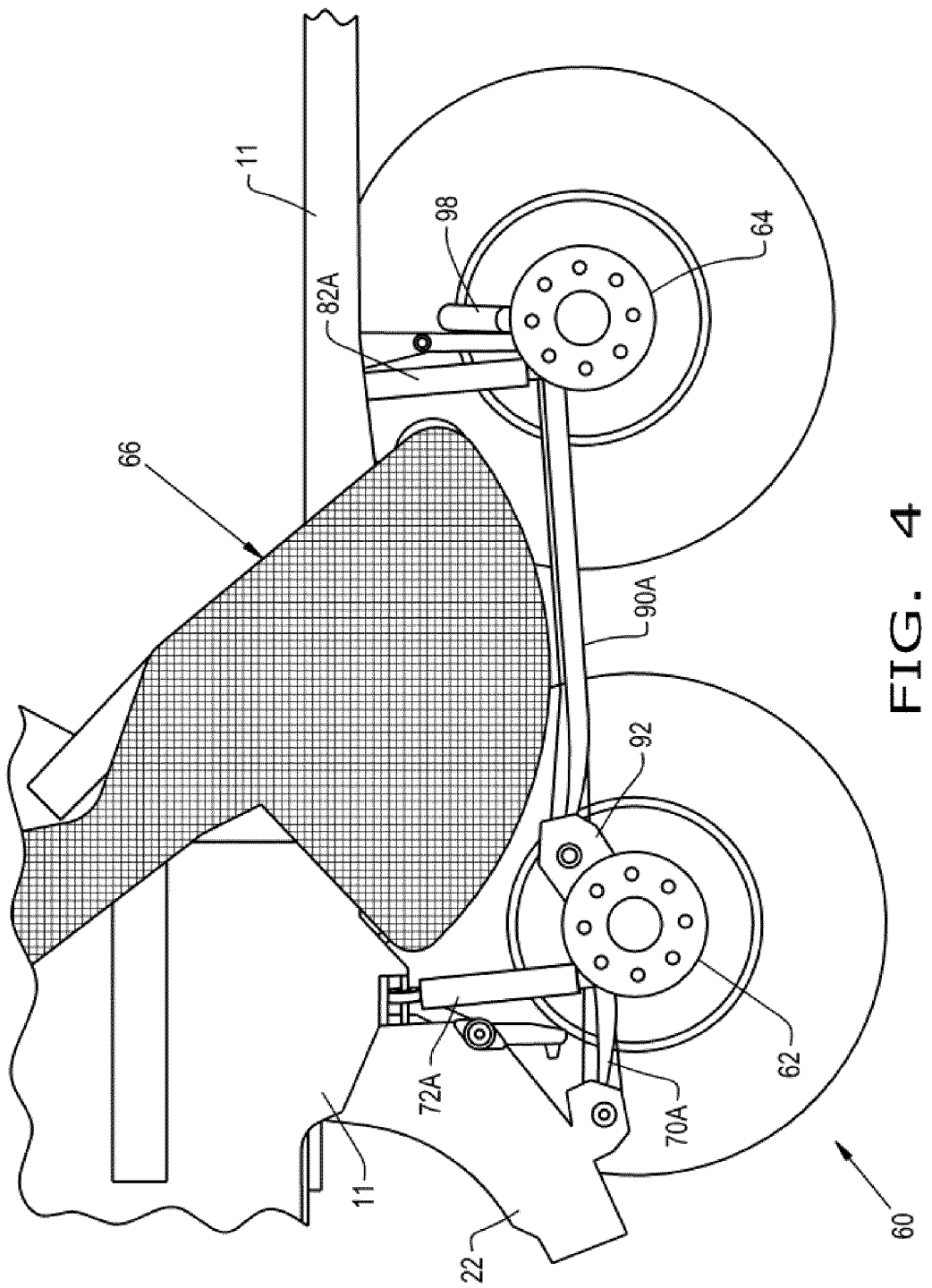

ated to agricultural balers, and,
more particularly, to axle arrangements used with such
balers.

AXLE ARRANGEMENT FOR AN AGRICULTURAL BALER

BACKGROUND OF THE INVENTION

1. Field of the Invention

The present invention relates to agricultural balers, and, more particularly, to axle arrangements used with such balers.

2. Description of the Related Art

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a feeding channel (also known as a "precompression chamber"). The packer unit forms a wad of crop within the feeding channel which is then transferred to a main bale chamber. (For purposes of discussion, the charge of crop material within the feeding channel will be termed a "wad", and the charge of crop material after being compressed within the main bale chamber will be termed a "flake"). Typically such a packer unit includes packer tines or forks to move the crop material from the pickup unit into the feeding channel. Instead of a packer unit it is also known to use a rotor cutter unit which chops the crop material into smaller pieces.

A stuffer unit transfers the wad of crop material in charges from the feeding channel to the main bale chamber. Typically such a stuffer unit includes stuffer forks which are used to move the wad of crop material from the feeding channel to the main bale chamber, in sequence with the reciprocating action of a plunger within the main bale chamber.

In the main bale chamber, the plunger compresses the wad of crop material into flakes to form a bale and, at the same time, gradually advances the bale toward the outlet of the bale chamber. The plunger reciprocates, back and forth, toward and away from the discharge end of the baler. When enough flakes have been added and the bale reaches a full (or other predetermined) size, a number of knotters are actuated which wrap and tie twine, cord or the like around the bale while it is still in the main bale chamber. The twine is cut and the formed baled is ejected out the back of the baler as a new bale is formed.

Large square balers typically include tandem axles to support the weight of the baler and the bales within the baler. The tandem axles are usually coupled to the chassis of the baler by way of an inverted "Y" or yoke arrangement at the ends of the axles, with the apex of the yoke being pivotally coupled to the chassis of the baler. This mechanical interconnection between the axles allows the axles to move together as the baler traverses over uneven ground. These types of tandem axle arrangements can also be called a "bogie".

For some baler arrangements, an axle suspension system as described above with an inverted yoke arrangement may not be possible or desirable. Moreover, a needle arrangement which is used to feed twine through a formed bale typically includes a needle yoke which moves along a travel path below the baler and potentially can interfere with the configuration of the front and rear axles. With a needle yoke positioned at the bottom of a baler, an inverted Y or bogie design tandem axle arrangement may not be feasible.

What is needed in the art is an axle arrangement that does not interfere with a needle arrangement positioned at the bottom of an agricultural baler.

SUMMARY OF THE INVENTION

The present invention provides an agricultural baler having an axle arrangement with suspension cylinders, in which a first axle is connected to the chassis, and a second axle is connected to the first axle via a pair of elongate members at respective ends of the axles.

The invention in one embodiment is directed to an agricultural baler including a chassis, a main bale chamber carried by the chassis, and an axle arrangement coupled with the chassis. The baler is characterized in that the axle arrangement includes a first axle, a second axle and a pair of elongate members. The first axle has a first end and a second end. A first suspension cylinder is positioned at the first end and a second suspension cylinder is positioned at the second end to accommodate generally vertical loads. The first axle is coupled with the chassis to accommodate generally horizontal loads on the first axle. The second axle has a first end and a second end. A first suspension cylinder is positioned at the first end and a second suspension cylinder is positioned at the second end to accommodate generally vertical loads. A pair of elongate members interconnect the second axle with the first axle to accommodate generally horizontal loads on the second axle. The pair of elongate members include a first elongate member and a second elongate member. The first elongate member interconnects the first end of the second axle with the first end of the first axle. The second elongate member interconnects the second end of the second axle with the second end of the first axle.

In another embodiment, the first elongate member and the second elongate member each are in the form of a leaf spring extending between the second axle and the first axle.

In another embodiment, the first elongate member and the second elongate member are each coupled with the first axle via a pivotal connection.

In yet another embodiment, the first elongate member and the second elongate member are each coupled with the second axle via a rigid connection.

In yet another embodiment, a lateral stabilization member interconnects between the second axle and the chassis.

In yet another embodiment, the lateral stabilization member is a rod which is pivotally coupled with the second axle and the chassis.

In a further embodiment, the baler includes a needle yoke which pivots during operation along an arcuate travel path under the baler, and wherein the pair of elongate members are positioned below the travel path of the needle yoke.

In a further another embodiment, the baler includes a pickup unit and a feeding channel for receiving crop from the pickup unit, and wherein the first axle includes a pair of leaf springs positioned at the respective opposite ends of the first axle. The feeding channel defines a structural member which is coupled with the chassis, and the leaf springs of the first axle are pivotally coupled with the feeding channel, and thereby indirectly coupled to the chassis by way of the feeding channel.

In a further embodiment, the first axle is mounted rearwardly of the feeding channel, thereby lowering an effective axle height of the axle arrangement.

In a still further embodiment, each leaf spring is a generally horizontally arranged leaf spring.

In a still further embodiment, each of the leaf springs provide lateral stabilization of the first axle.

In another embodiment of the invention, the axle arrangement has at least two axles (two, three, four, etc.), including the first axle and the second axle.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 4 is another side view of the portion of the baler shown in FIGS. 2 and 3, illustrating the travel path of the needle yoke during operation.

Corresponding reference characters indicate corresponding parts throughout the several views. The exemplification set out herein illustrates an embodiment of the invention, and such exemplification is not to be construed as limiting the scope of the invention in any manner.

DETAILED DESCRIPTION OF THE INVENTION

Figure 1:
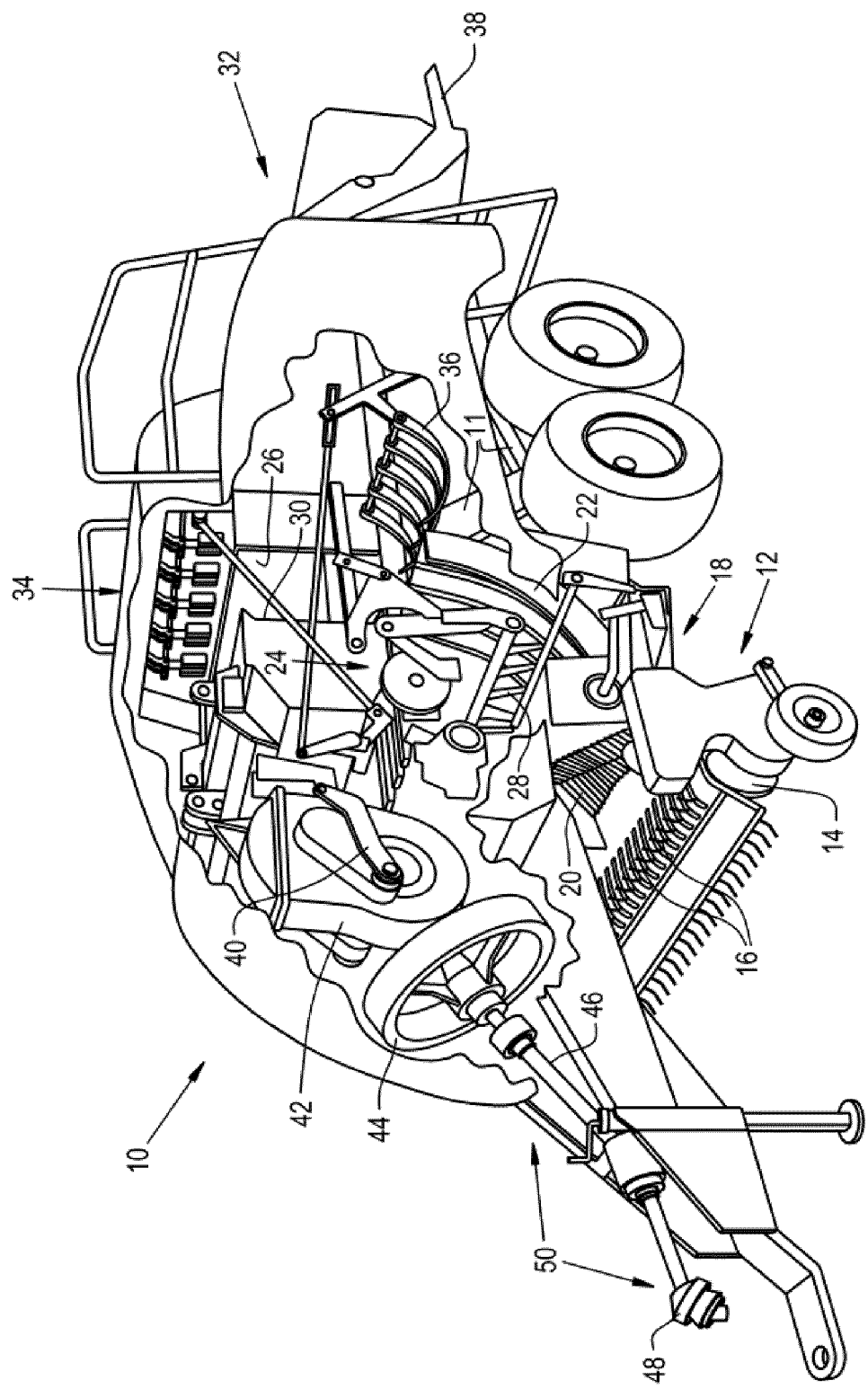
FIG. 1 is a perspective cutaway view showing the internal workings of a large square baler, which can include an axle arrangement of the present invention.

Referring now to the drawings, and more particularly to FIG. 1, there is shown a perspective cutaway view showing the internal workings of a large square baler 10. Baler 10 includes a chassis 11 carrying a number of baler components (described below), and operates on a two stage feeding system. Crop material is lifted from windrows into the baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the pickup roll 14 to move the crop material laterally inward. The packer unit 18 includes packer tines 20 which push the crop into a feeding channel 22 to form a wad of crop material. The packer tines 20 intertwine the crop together and pack the crop within the feeding channel 22. Feeding channel 22 and packer tines 20 function as the first stage for crop compression. Once the pressure in the feeding channel 22 reaches a predetermined sensed value, a stuffer unit 24 moves the wad of crop from the feeding channel 22 to a main bale chamber 26. The stuffer unit 24 includes stuffer forks 28 which thrust the wad of crop directly in front of a plunger 30, which reciprocates within the main bale chamber 26 and compresses the wad of crop into a flake. Stuffer forks 28 return to their original stationary state after the wad of material has been moved into the main bale chamber 26. Plunger 30 compresses the wads of crop into flakes to form a bale and, at the same time, gradually advances the bale toward outlet 32 of main bale chamber 26. Main bale chamber 26 and plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process then takes place. The twine is cut and the formed bale is ejected from a discharge chute 38 as a new bale is formed.

Figure 2:
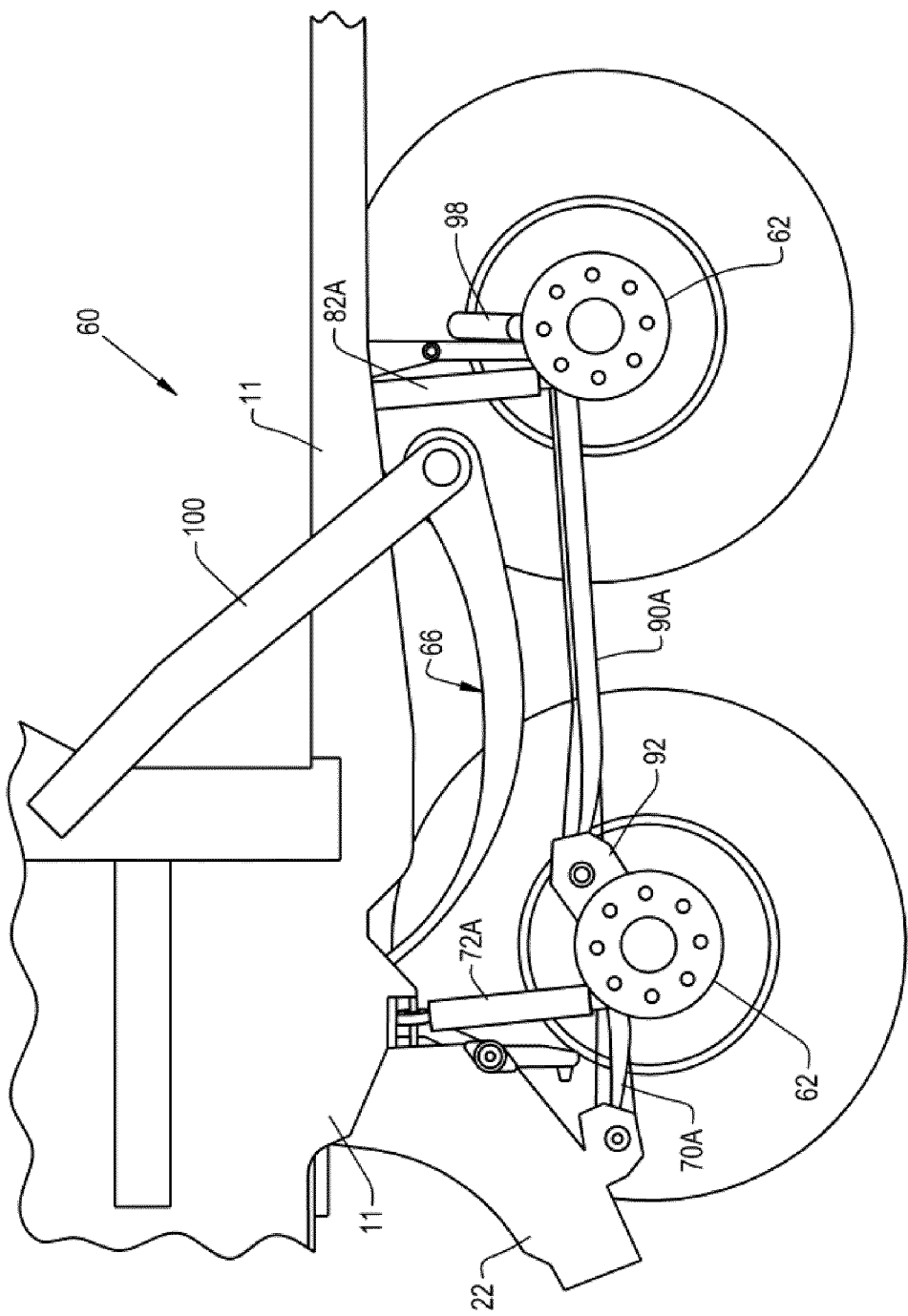
FIG. 2 is a side view of a portion of the baler shown in FIG. 1, including an embodiment of the axle arrangement of the present invention, with the two wheels removed on the near side for ease of illustration.
Figure 3:
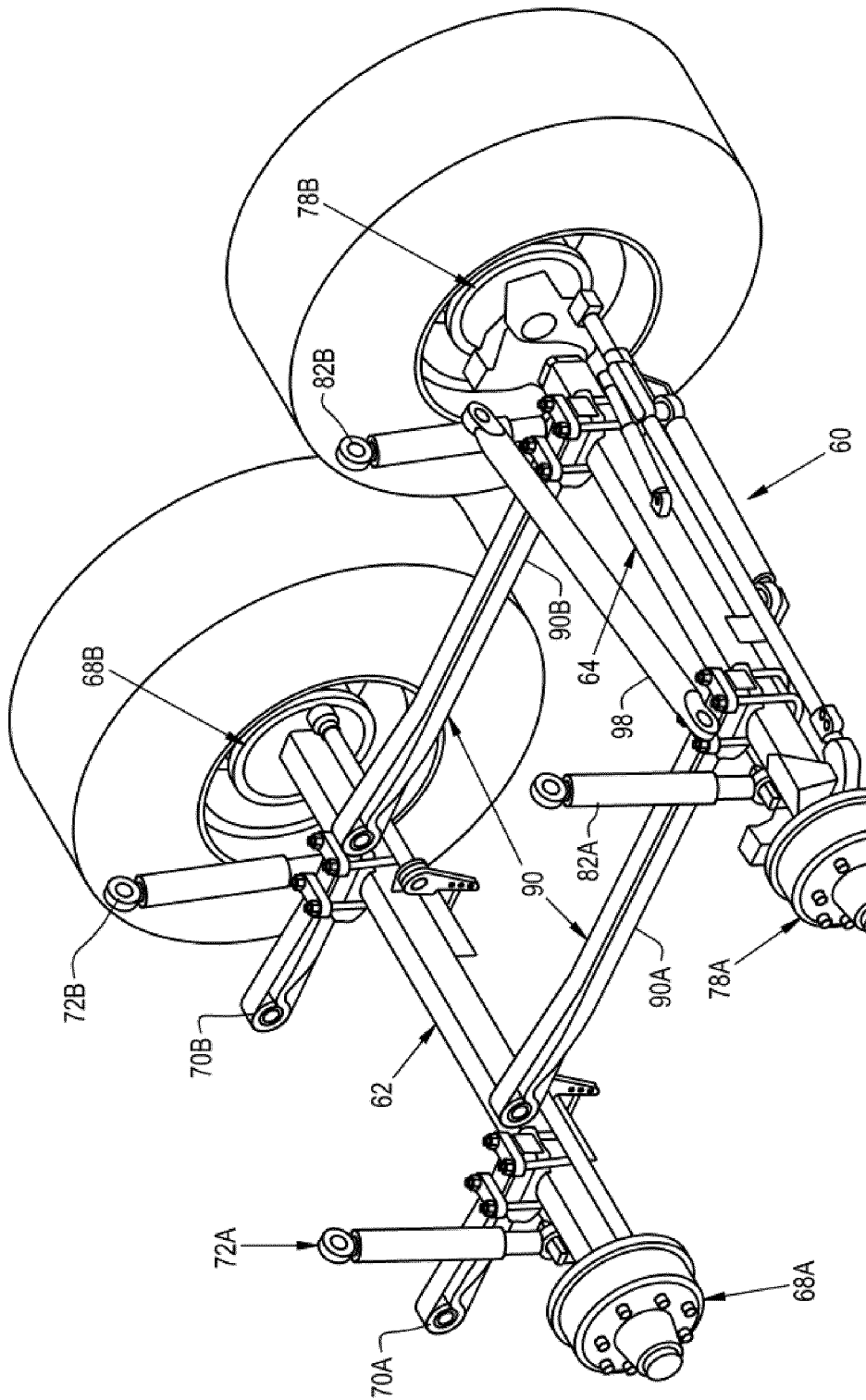
FIG. 3 is a perspective view of the axle arrangement shown in FIG. 2.

Plunger 30 is connected via a crank arm 40 with a gear box 42. Gear box 42 is driven by a flywheel 44, which in turn is connected via a drive shaft 46 with the power take-off (PTO) coupler 48. The PTO coupler 48 is detachably connected with the PTO spline at the rear of the traction unit, such as a tractor (not shown). PTO coupler 48, drive shaft 46 and flywheel 44 together define a portion of a driveline 50 which provides rotative power to gearbox 42. Flywheel 44 has a sufficient mass to carry plunger 30 through a compression stroke as power is applied to drive shaft 46 by the traction unit. According to an aspect of the present invention, and referring now to FIGS. 2-4, the agricultural baler 10 includes an axle arrangement 60 having a first axle 62 and a second axle 64. The first axle 62 is connected to the chassis 11, and the second axle 64 is connected to the first axle 62, thereby allowing the axle arrangement 60 to be positioned below a needle arrangement 66 at the bottom of the baler 10.

More particularly, the first axle 62 has opposite ends 68A and 68B, with a pair of leaf springs 70A and 70B, and a pair of suspension cylinders 72A and 72B, positioned at each respective end. The generally vertically arranged suspension cylinders 72A and 72B accommodate generally vertical loads, such as the weight of the bale(s) and the dynamic vertical loads as the baler 10 traverses over the ground.

The first axle 62 is also coupled with the chassis 11 to accommodate generally horizontal loads. In the illustrated embodiment, the first end 68A is coupled with the chassis 11 by the first leaf spring 70A, and the second end 68B is coupled with the chassis 11 by the second leaf spring 70B. This interconnection between the first axle 62 and the chassis 11 can be direct or indirect.

For example, in one embodiment, the feeding channel 22 can define a structural member which is coupled with the chassis 11. This is in contrast with conventional designs, wherein the feeding channel 22 is a non-structural component made of light metal which directs the crop into the main bale chamber 26. The leaf spring 70A and 70B are pivotally coupled with the feeding channel 22 (FIGS. 2 and 4), and thereby indirectly coupled to the chassis 11 by way of the feeding channel 22. The first axle 62 can be mounted rearwardly of the feeding channel 22, thereby lowering an effective axle height of the axle arrangement 60.

In the embodiment of the invention shown in the drawings, the leaf springs 70A and 70B are generally horizontally arranged leaf springs. It may be possible in other applications, however, to arrange the leaf springs other than horizontally. Moreover, in the embodiment of the invention shown in the drawings, each of the leaf springs 70A and 70B provide lateral stabilization of the first axle 62. It may be possible in other applications, however, to provide the lateral support with other structure, such as a tie rod extending between the chassis 11 and the first axle 62, or other structure providing lateral support.

The second axle 64 has a first end 78A and second end 78B, with a pair of suspension cylinders 82A and 82B, positioned at each respective end. The generally vertically arranged suspension cylinders 82A and 82B accommodate generally vertical loads, such as the weight of the bale(s) and the dynamic vertical loads as the baler 10 traverses over the ground.

The needle arrangement 66 can interfere with the attachment of the second axle 64 to the chassis 11 in order to accommodate horizontal loads. An inverted Y yoke or bogie arrangement at the outboard ends of the second axle 64 may not be possible or feasible. Accordingly, the second axle 64 can be coupled with the first axle 62 to accommodate generally horizontal loads.

In one embodiment of the invention, a pair of elongate members 90 interconnect the second axle 64 with the first axle 62 to accommodate generally horizontal loads on the second axle 64. More specifically, the pair of elongate members 90 include a first elongate member 90A and a second elongate member 90B. The first elongate member 90A interconnects the first end 78A of the second axle 64 with the first end 68A of the first axle 62. The second elongate member 90B interconnects the second end 78B of the second axle 64 with the second end 68B of the first axle 62.

In the illustrated embodiment, the first elongate member 90A and the second elongate member 90B are each configured as a leaf spring extending between the second axle 64 and the first axle 62. The particular configuration of the leaf springs can vary from one application to another, such as the number of leaves making up the leaf spring, dimensions of the leaf spring, type of material, etc. Also, each elongate member 90A and 90B can be differently configured. For example, each elongate member 90A and 90B can be configured as a tube (with round, square, rectangular, etc cross section), solid rod, angle iron, C-channel, etc.

The first elongate member 90A and the second elongate member 90B can be coupled at the respective opposite ends via suitable connections with the first axle 62 and the second axle 64. For example, the first elongate member 90A and the second elongate member 90B can be coupled with the first axle 62 via respective pivotal connections, and can be coupled with the second axle 64 via respective rigid connections. In the embodiment shown, the first axle 62 includes a pair of brackets 92 which are pivotally connected via a bolted connection with the front ends of the first elongate member 90A and the second elongate member 90B. The rear ends of the first elongate member 90A and the second elongate member 90B are shown bolted to the second axle 64 via suitable U-bolts or the like. Other types of connections are also possible.

Because of the way in which the second axle 64 is coupled with the chassis by way of the suspension cylinders 82A, 82B and the at least one elongate member 90, it may be desirable to laterally support or stabilize the second axle 64. For example, a lateral stabilization member 98 can interconnect between the second axle 64 and the chassis 11. The lateral stabilization member 98 can be configured as a rod which is pivotally coupled with the second axle 64 and the chassis 11 (such as with a ball joint, bolt with bushing, etc.). Alternatively, the lateral stabilization could be provided differently, such as a fluid cylinder, spring(s), etc. In the case of a cylinder, the cylinder could also be used to provide the added functionality of moving the axle from side to side, etc.

Referring now to FIG. 4, the arcuate travel path of the needle arrangement 66 can be seen, which basically corresponds to the unusable area under the baler 10 that can interfere with the configuration of the axle arrangement 60. The needle arrangement 66 includes a needle yoke 100 which pivots during operation along and under the baler 10. The elongate members 90 which interconnect the first and second axles 62 and 64, and take up the horizontal loading on the second axle 64, are positioned below the travel path of the needle yoke 100.

In the embodiment shown and described above, the axle arrangement 60 is in the form of a tandem axle arrangement, including the first axle 62 and the second axle 64. The first axle 62 is configured as the front axle, and the second axle 64 is configured as the rear axle. However, it may be possible to configure the axle arrangement of the present invention with more than two axles. For example, it may be possible to configure the axle arrangement of the present invention with 3 axles, with the third axle coupled to the second axle by way of another pair of elongate members 90 interconnecting the third axle (not shown) with the second axle 64 to accommodate generally horizontal loads on the third axle. Thus, the concepts of the present invention can be extended to an axle arrangement with two or more axles.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:
1. An agricultural baler, comprising:
a chassis;
a main bale chamber carried by the chassis;
a needle yoke which pivots during operation along an arcuate travel path under the baler; and
an axle arrangement coupled with the chassis, the axle arrangement comprising:
a first axle having a first end and a second end, a first suspension cylinder positioned at the first end, and a second suspension cylinder positioned at the second end to accommodate generally vertical loads, the first axle being coupled with the chassis to accommodate generally horizontal loads on the first axle;
a second axle having a first end and a second end, a first suspension cylinder positioned at the first end, and a second suspension cylinder positioned at the second end to accommodate generally vertical loads; and
a pair of elongate members interconnecting the second axle with the first axle to accommodate generally horizontal loads on the second axle, the pair of elongate members including a first elongate member and a second elongate member, the first elongate member interconnecting the first end of the second axle with the first end of the first axle, the second elongate member interconnecting the second end of the second axle with the second end of the first axle, and wherein the pair of elongate members is positioned below the travel path of the needle yoke, and the generally horizontal loads from the second axle are transferred to the chassis through the first and second elongate members and the first axle.

2. The agricultural baler of claim 1, wherein each of the first elongate member and the second elongate member each comprises a leaf spring extending between the second axle and the first axle.

3. The agricultural baler of claim 1, wherein each of the first elongate member and the second elongate member is coupled with the first axle via a pivotal connection.

4. The agricultural baler of claim 1, wherein each of the first elongate member and the second elongate member is coupled with the second axle via a rigid connection.

5. The agricultural baler of claim 1, further comprising a lateral stabilization member interconnected between the second axle and the chassis.

6. The agricultural baler of claim 5, wherein the lateral stabilization member is a rod which is pivotally coupled with the second axle and the chassis.

7. The agricultural baler of claim 1, further comprising a pickup unit and a feeding channel for receiving crop from the pickup unit, and wherein the first axle includes a pair of leaf springs positioned at respective ends of the first axle, the feeding channel defining a structural member which is coupled with the chassis, and wherein the leaf springs of the first axle are pivotally coupled with the feeding channel, and thereby indirectly coupled to the chassis by way of the feeding channel.

8. The agricultural baler of claim 7, wherein the first axle is mounted rearwardly of the feeding channel, thereby lowering an effective axle height of the axle arrangement.

9. The agricultural baler of claim 7, wherein each of the leaf springs is a generally horizontally arranged leaf spring.

10. The agricultural baler of claim 7, wherein each of the leaf springs provides lateral stabilization of the first axle.

11. The agricultural baler of claim 1, wherein the first axle and the second axle are each individually suspended, and the first axle is connected to the chassis in front of the arcuate travel path of the needle yoke and the second axle is connected to the chassis behind the arcuate travel path of the needle yoke so that the axle arrangement is positioned below the needle yoke without interfering with the arcuate travel path of the needle yoke.

12. The agricultural baler of claim 1, wherein the axle arrangement has an absence of a connection point with the chassis in an area underneath the arcuate travel path of the needle yoke.

\* \* \* \* \*